Figure 1:
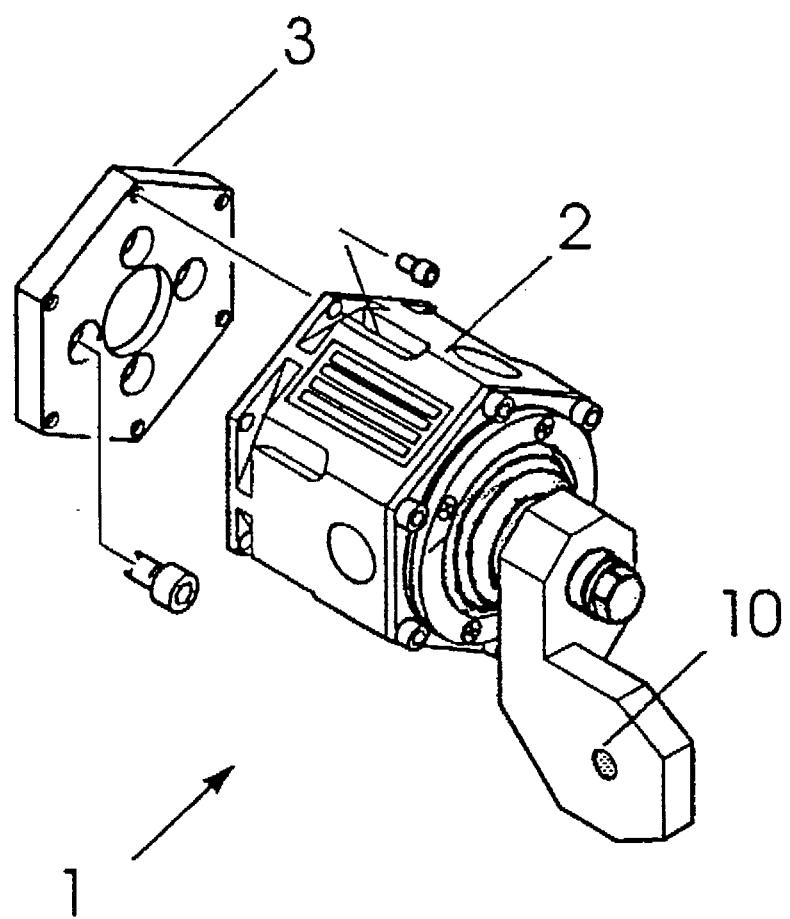

United States Patent [19]
Sperling et al.

[11] Patent Number: 5,626,216
[45] Date of Patent: May 6, 1997

[54] TOOL HOLDER, IN PARTICULAR FOR ROBOT WELDING OR CUTTING TORCHES

[76] Inventors: Hermann Sperling, Am Schwarzfelder Weg 24, D-55296 Bau-Bischhofsheim; Jörg Schwarz, Kleinfeldchen 4, D-35418 Alten-Buseck; Jörg Manche, Herborner - Strasse 43, D-35614 Asslar, all of Germany

[21] Appl. No.: 436,314

[22] PCT Filed: Sep. 13, 1994

[86] PCT No.: PCT/EP94/03053

§ 371 Date: Aug. 3, 1995

§ 102(e) Date: Aug. 3, 1995

[87] PCT Pub. No.: WO95/07802

PCT Pub. Date: Mar. 23, 1995

[30] Foreign Application Priority Data

Sep. 13, 1993 [DE] Germany ............... 43 30 877.5

[51] Int. Cl.⁶ ........................................ B25J 19/06
[52] U.S. Cl. ........................ 192/150; 192/56.62; 464/36; 901/49
[58] Field of Search ................... 192/56.33, 56.43, 192/56.54, 56.57, 56.62, 69.5, 150; 464/36; 901/11, 13, 29, 46, 49

[56] References Cited

U.S. PATENT DOCUMENTS

| | | | |
|---|---|---|---|
| 4,700,932 | 10/1987 | Katsumo | 901/49 X |
| 4,717,003 | 1/1988 | McCormick et al. | 901/49 X |
| 4,848,546 | 7/1989 | McCormick et al. | 901/49 X |
| 4,860,864 | 8/1989 | Cwycyshyn et al. | 901/49 X |
| 4,884,670 | 12/1989 | McCormick et al. | 901/49 X |
| 4,954,005 | 9/1990 | Knasel et al. | 901/49 X |
| 4,998,606 | 3/1991 | McCormick et al. | 901/49 X |
| 5,086,901 | 2/1992 | Petronis et al. | 901/49 X |

FOREIGN PATENT DOCUMENTS

| | | |
|---|---|---|
| 0249774 | 12/1987 | European Pat. Off. |
| 3717616 | 12/1988 | Germany. |
| 3728204 | 3/1989 | Germany. |

*Primary Examiner*—Richard M. Lorence
*Attorney, Agent, or Firm*—Price, Henevled, Cooper, DeWitt & Litton

[57] ABSTRACT

A tool holder for robotic curing or welding torches includes a housing having a facing part, a stop plate which is at least partially disposed within the housing and has a home position in which the stop plate is disposed proximate the housing facing part. A tool connection coupled to the stop plate is provided so that movement of the tool connection causes movement of the stop plate. A piston element is axially movably mounted in the housing and biased toward the stop plate. The piston element is disposed to be contacted by the stop plate and selectively slid axially in response to movement of either the tool connection or the stop plate. A detector sensor device including a trigger is disposed on the housing to be triggered by axial movement of the piston element. A plurality of positioning elements disposed between the stop plate and the housing facing part are cooperatively configured with at least one of the stop plate and the housing facing part so that in the home position only three of the positioning elements contact both the stop plate and the housing facing part and position the stop plate relative to the housing facing part to form three home positioning element. At least one additional positioning element is adapted to position the stop plate in response to either the tool connection or the stop plate being tilted.

19 Claims, 5 Drawing Sheets

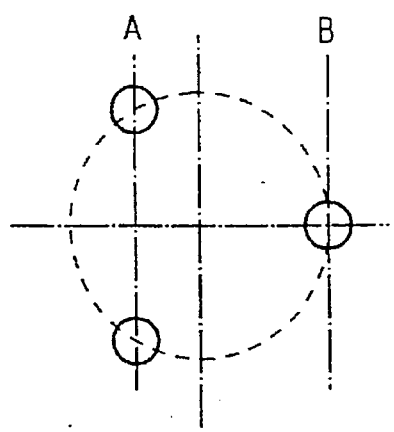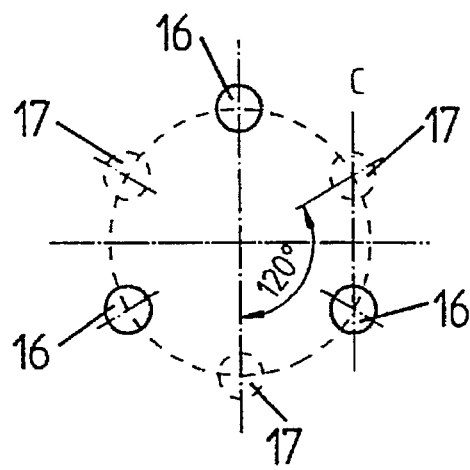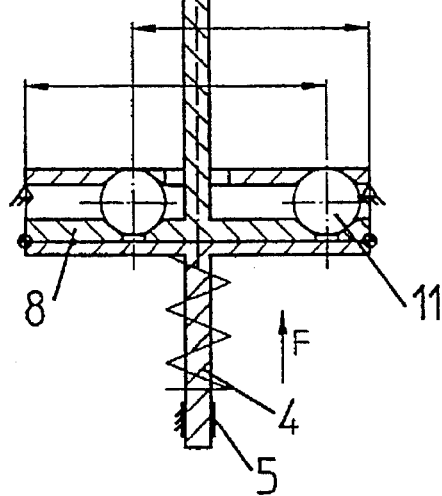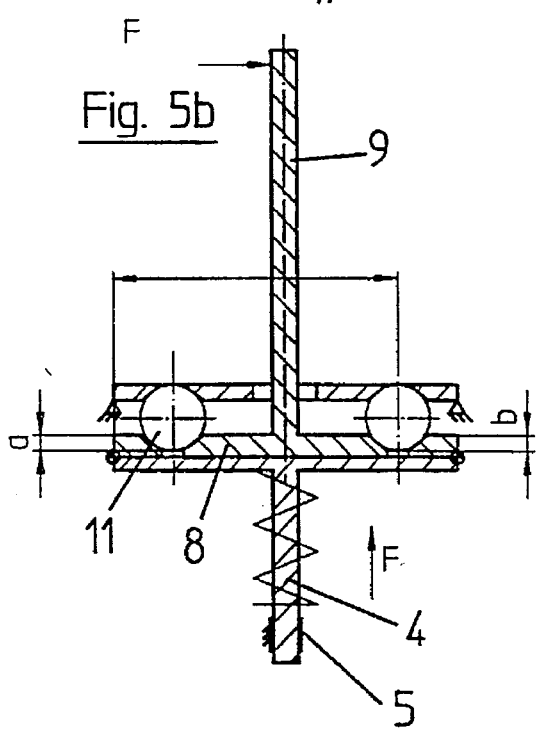

TOOL HOLDER, IN PARTICULAR FOR ROBOT WELDING OR CUTTING TORCHES

This application claims the benefit of the filing date of International Application No. PCT/EP94/03053, filed Sep. 13, 1994.

Holders of that variety serve to hold a tool like a curing torch in the arm of a robot and let the tool swerve out of the way during a collision between the tool or the cutting torch and the work piece or a peripheral part during operations. This will avoid damaging the tool or the work piece. For such evasive movements of a tool, an emergency interrupt switch is activated, which either turns off the movement of the robot or resets the robot arm to home position.

A torch holder as initially described is familiar for instance from U.S. Pat. No. 4,998,606; it has a spring driven piston part within a housing, and the housing also contains a release lever for a stop plate in home position which is linked to a tool connection at the near housing wall. During excess pressure or deflection of the tool connection, the spring loaded piston part causes an axial deviation, which activates a switch for shutting off the robot or for resetting it to home position. Asymmetrically distributed in an arc on the stop plate are half spherical elements, which in home position are depressed into indentation in the adjacent housing lid. But the disadvantage is, that the spherical seats or indentations have to be tooled very precisely for the tool connection always to return to its home position. This is especially important on the robot arm for regaining the stated point of reference of the tool, as with welding or cutting torches. Tiffs point of reference is usually called Tool Center Point, TCP for short.

For this reason, the invention has the objective of developing a tool holder of the initially described variety in such a way, that it can achieve a uniform release force for all direction changes of the tool connection and can attain high precision in reversing to the home position, even in compact installations, with the greatest angle of radial excursion.

This is one of the objectives met by the characteristics identified in the paragraphs of claim 1.

The three point support of the stop plate linked to the tool connector assures a stable and especially tilt resistant support of the tool in its home position. The three point support also enables higher reset precision after a possible radial excursion of the tool because of a collision. Since a tilting movement makes more positioning elements available for support, the advantages of the multiple point support help in providing equal release forces for all tilt directions.

One design of the invention places the three positioning elements, located in the home position of the stop plate, in the corners of an isosceles triangle, which brings about a highly stable and tilt resistant positioning of the tool.

It is also recommended, that the active positioning elements between the stop plate and the housing am arranged symmetrically in an arc, which benefits the equalization of the relative forces of the various tilt directions.

One design of the invention requires the positioning elements to be spheres fixed in a mount with matching indentations in the stop plate, but the seats of the three positioning elements in the home position of the stop plate should be shallower than all the others. This simple construction and production method realizes a three point support in the home position and a six point or higher support during a tilting movement of the tool.

The piston part and the stop plate are prevented from rotating against each other, another advantage. The invention realizes this by including at least one alignment pin in the stop plate with a matching bored hole in the piston part. This assures that during an undesired tilting of the tool the movable piston part will also turn and the safety switch is activated.

A different arrangement of the invention proposes, that the piston part has a radial collar to the outside, which activates a switch element within a detector device during an axial displacement of the piston part. It is best, if this collar extends only across a defined angle around the piston part. In this manner, the robot motor is switched off in all positions except the home position.

Other design possibilities of the invention are listed in the additional sub claims.

Further aims, advantages, characteristics, and application possibilities arise from the following description of production models as illustrated in the drawing. Thus all described and/or graphically displayed features represent, by themselves or in any random combination, the object of the present invention, independent of their claims summary or their relative connection.

The following is shown in:

FIG. 1 a perspective view of a possible type of tool holder, according to specifications of the invention.

Figure 2:
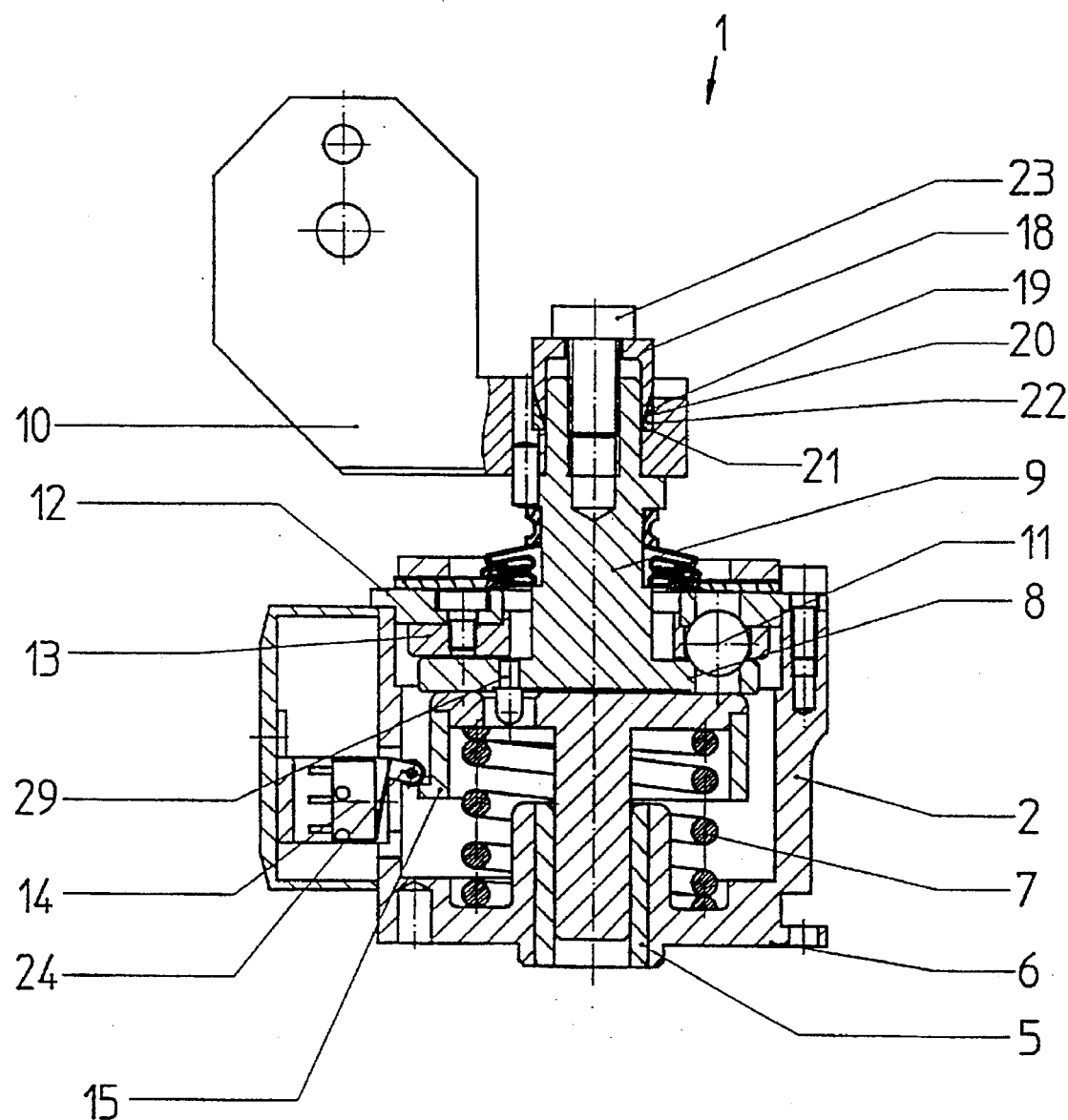

FIG. 2 a longitudinal diagram of the tool holder from FIG. 1.

Figure 3:
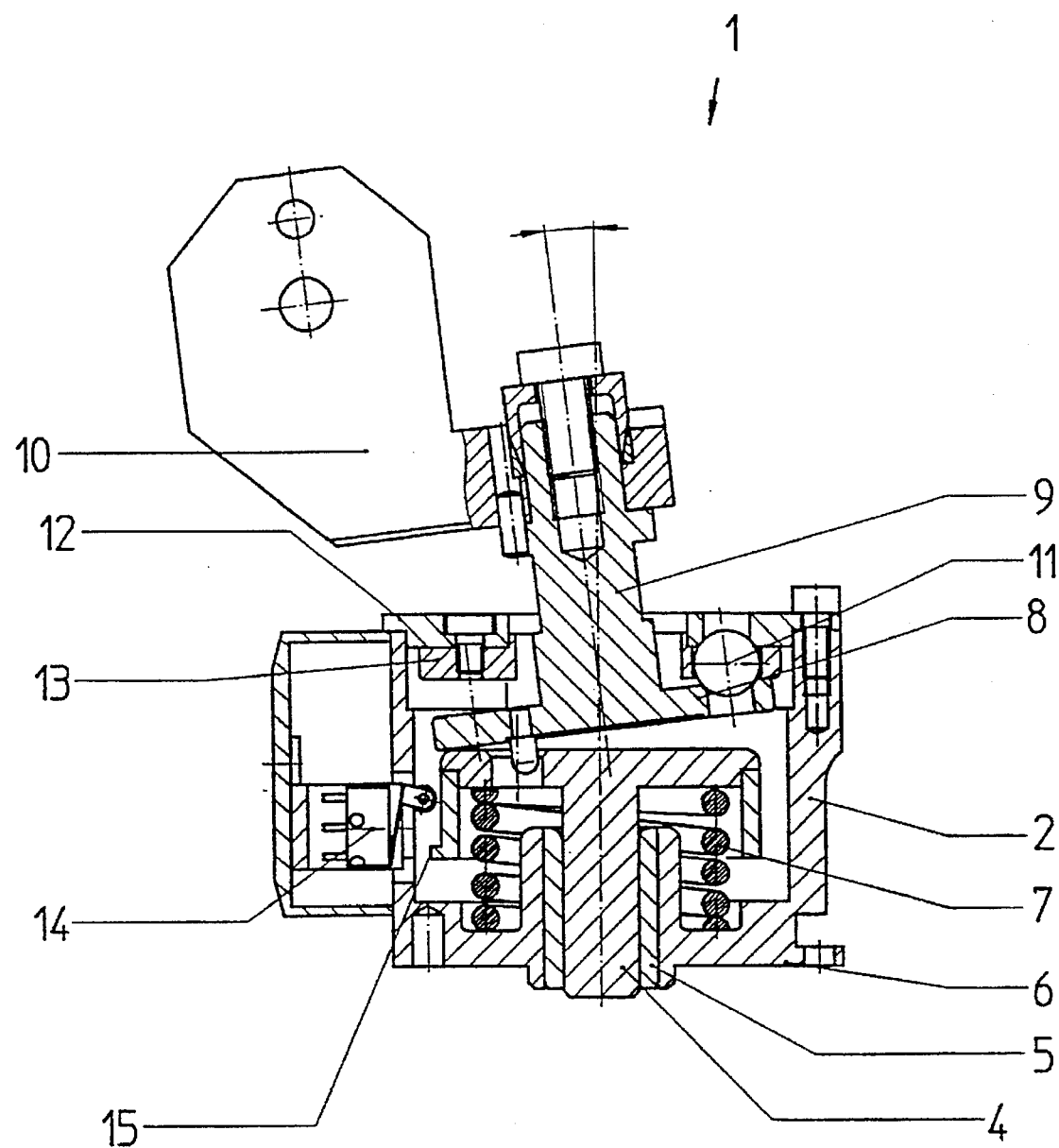

FIG. 3 the tool holder of FIG. 1 with a deflected position of the tool as during a collision with a piece of work.

Figure 6:
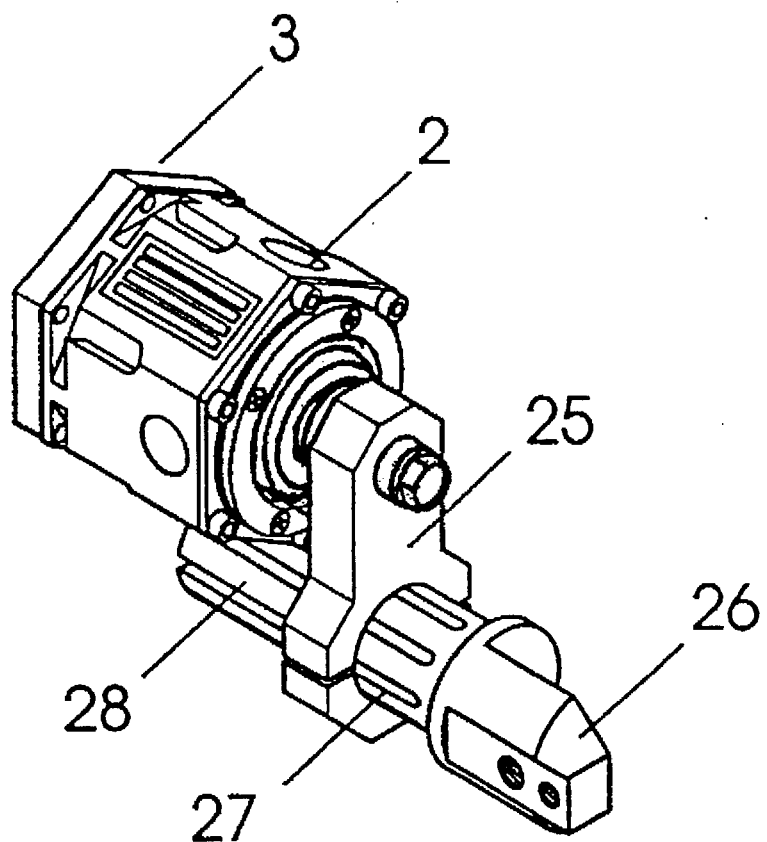

FIG. 4a a schematic view of the three point support of a tool holder,

FIG. 4b a cross sectional view of the same three point support,

FIG. 5a a schematic view of the layout of a tool holder using the six point support FIG. 5b the constructive design of the support of the tool holder in FIG. 5a FIG. 6 the tool holder in FIG. 1 with a tool connection of different design The tool holder 1 of FIG. 1 is attached to a robot arm (not shown) by a flange 3. As seen in FIG. 2, there is a movable piston part 4 within an axial guide 5 inside of the pot shaped housing 2 of the tool holder 1. The axial guide 5 of the selected production model is attached to the bottom 6 of the housing 2, closest to the robot arm. The piston part 4 is pressed to the plate shaped stop part 8 of the release lever 9. The release lever 9 is linked to a tool connection 10, where tools like welding torches or tool holding fixtures can be fastened.

The stop plate 8 of the release lever 9 is supported by spheres 11, symmetrically arranged in an are on the closing front lid 12 of the housing. In the selected model, the spheres 11 are enclosed like in a mount 13 in the shape of a cage which is connected to the lid 12. Of course, it is also possible to attach the cage 13 to the stop plate 8 of the release lever 9. In the start position of the release lever 9, a more detailed description of tiffs will follow, the spheres 11 lock into the corresponding indentations 16, 17 of the stop plate 8. In this condition, the release lever 9 is in its home position or has reached the point of reference for the control of the robot arm.

A collision between the robot or the tool with the work piece or a peripheral part causes the release lever 9 to tilt, as illustrated in FIG. 3. This tilting movement averts damage to the tool, the work piece, or the pertinent peripheral part. The deflection tips the stop plate 8 of the release lever 9, which pushes the piston part 4 against the force of the spring 7 into the direction of the bottom 4 of the housing 2. This triggers an emergency interrupt switch, which turns off the movement of the robot arm or resets it to its home position. The circuit design for the selected model assures that the collar 15 on the piston part 4, which extends radially to the outside, never comes in contact with the switch element 24 of the circuit or the detector device 14. With this tool holder 1, each compression and/or tilt movement of the release lever 9 linked to any tool is translated into an axial movement of the piston part 4, which with the switch dement 24 causes the robot arm to turn off or to reverse.

The radial collar 15 on the piston part 4 in the selected model extends only across an arc of 45°, so that the movement of the robot arm is deactivated in all positions but the home position.

As can be further seen in FIG. 2, the stop plate 8 contains an aligning pin 29, which fits into a matching bored hole in the piston part 4, so flint the stop plate 8 and the piston part 4 are securely linked, without being able to rotate individually.

The tool holder illustrated in the production model includes a six point support between the stop plate 8 of the release lever 9 and the closing lid 12 of the housing 2. Such a six point support has the advantage of a uniform release force in comparison to a three point or even a five point support. The following is a more detailed description with the aid of FIGS. 4 and 5.

Generally, a three point support is advantageous for securing a stable and especially tilt resistant placement for a work piece or a tool. A three point support for the robot mount, as illustrated in FIGS. 4a and 4b, has high reset precision, when e.g. it is necessary to reset to the point of reference after a deflection of the tool because of a collision with the work piece. But a disadvantage of the three point support is, that the release force can be different, depending on the direction of the tilt movement, as can be seen from FIGS. 4a and 4b. A minimal release force is necessary for tilting over two points like a tilting along the A axis. Whereas for tilting around one point, corresponding to tilting along the B axis, a maximum release force is needed, since another leverage action applies than that for tilting along the A axis. As demonstrated in FIGS. 5a and 5b, the six point support was chosen for this selected production model in order to equalize the levers. Of course, it is also possible to install a nine, twelve, or even fifteen point support. In that case, the tilting C axle is moved to the outside in comparison to the three point support, so flat the difference between minimum and maximum release force is significantly smaller, Consequently the tilting C axis determines the direction of the smallest release force.

But generally, the advantages of the three point support are lost in such arrangements. To avoid this, the indentations or seats 16, 17 provided in the stop plate 8 for the spheres 11 alternate in depth.

As indicated in FIG. 5b, the recesses 17 are indented by a greater depth measure "b" than the recesses 16 with the depth measure "a". In home position, the stop plate 8 of the release lever 9 only rests on the spheres 11 which fit in the coordinated seats 16. This assures a three point support at home position. But even during scant tilting, the spheres 11 in the direction of the tilt rest in the deeper indentations 17 of the stop plate 8 and, therefore, the advantageous force conditions of a six point support come into existence with equal release forces along all tilt directions. Note for the seats 16, 17, that the emergency interrupt switch element is not activated until the stop plate 8 truly rests on the spheres 11 with the corresponding deeper seats 17.

Fastening the tool connection 10 to the mount occurs with an annular spring tension element 18, which in contact position fits with its frontal conical face 19 into the complementary face 20 of an inner support ring 22 on the collar 21 of the tool connector 10. The annular spring tension element 18 is kept in a pressure fitting against the inner ring 22 by a screwable screw connection 23 attached to the release lever 9. First, this achieves a great fastening strength, since the spring tension element 18 is pressed to the inside and the inner ring 22 expands radially to the outside. At the same time, because of the elasticity of the spring tension element 18, only a small trigger momentum results when the screw connection is released.

The difference of the tool holder in FIG. 6 and that in FIG. 1 consists of the fact, that it includes a clamp adapter 25 for holding an axially adjustable tool support receptacle 26. This tool support receptacle 26 is infinitely adjustable and also turnable. In the selected production model, a turning angle of 30° each way is possible, while one or more pins attached to the clamp adapter 25 lock(s) into (a) corresponding longitudinal slot(s) 27. This achieves an independent self adjustment of the tool receptacle 26. Of course, it is also possible to situate the longitudinal slot(s) 27 at a different angle arrangement on the outer perimeter of the tool support receptacle 26.

In case the shaft 28 of the tool support receptacle 26 in the clamp adapter 25 is too close to the housing 2 of the tool holder or if it hits the housing 2 during a tilting movement, it is of course possible to shorten the shaft 28.

The outer contour of the housing 2 is hexagonal, which saves space or room as compared to a round housing in diameter and which is important for robot applications. Of special advantage is the weight reduction of the housing according to the invention, since the robot arm has to move less dead weight.

Reference List

1—tool holder
2—housing
3—flange
4—piston part
5—axial guide
6—bottom
7—tension spring
8—stop plate
9—release lever
10—tool connection
11—sphere
12—lid
13—mount, cage
14—detector device, circuit
15—collar
16—indentation, seat
17—indentation, seat
18—annular spring tension element
19—face
20—face
21—collar
22—inner ring
23—screw connection
24—switch element
25—clamp adapter
26—tool connection, tool support receptacle
27—longitudinal slot
28—shaft
29—pin
A—axis a—depth measure
B—axis b—depth measure
C—axis b—depth measure

We claim:

1. A tool holder for robotic cutting or welding torches, comprising:

a housing having a facing part thereof;

a stop plate at least partially disposed within said housing and having a home position in which said stop plate is disposed proximate said housing facing part;

a tool connection coupled to said stop plate so that movement of said tool connection causes movement of said stop plate;

a piston element axially movably mounted in said housing, said piston element biased toward said stop plate, said piston element disposed to be contacted by said stop plate and selectively slid axially in response to movement of either of said tool connection and said stop plate;

a detector sensor device including a trigger, said trigger disposed on said housing to be triggered by axial movement of said piston element; and a plurality of positioning elements mounted on at least one of said stop plate and said housing facing part, said positioning elements being positioned in recesses in at least one of said stop plate and said housing facing part, three of said positioning elements being located in recesses of a first depth and at least one additional positioning element being located in a recess of greater depth than said first depth so that in said home position only three of said positioning elements contact and position said stop plate relative to said housing facing part and form three home positioning elements, at least one additional positioning element in addition to said home positioning elements being adapted to position said stop plate in response to either of said tool connection and said stop plate being tilted.

2. The tool holder of claim 1, wherein said positioning elements are disposed so that when said stop part is in said home position and supported by the three home positioning elements, said three home positioning elements are arranged in the corners of an isosceles triangle.

3. The tool holder of claim 1, wherein the number of said positioning elements is a multiple of three.

4. The tool holder of claim 1, wherein said positioning elements are symmetrically arranged in an arc.

5. The tool holder of claim 1, wherein said positioning elements are in the form of at least half-spherical elements with corresponding seats.

6. The tool holder of claim 1, wherein said positioning elements are spheres and affixed to said housing within a retainer with corresponding seats in said stop plate and said three home positioning elements in the home position of said stop plate have a shallower depth than all the other seats.

7. The tool holder of claim 1, wherein said piston element and said stop plate are connected together so as to turn together.

8. The tool holder of claim 1, further comprising at least one alignment pin on said stop plate which is received into a matching bored hole in said piston element.

9. The tool holder of claim 1, wherein said piston element has an outside radial collar to activate said trigger of said detector sensor device when said piston element is deflected.

10. The tool holder of claim 9, wherein said collar only extends over an angle of about 45° along the perimeter of the piston element.

11. The tool holder of claim 1, wherein said stop plate has a release lever, said tool connection is fastened to said release lever on said stop plate with an annular spring tension element, which annular spring tension element has a conical face configured to fit into the corresponding face of said tool connection and is tightened in a pressure fitting with a screw.

12. The tool holder of claim 1, wherein said stop plate has a release lever, said tool connection is fastened to said release lever on said stop plate with a clamp adaptor.

13. The tool holder of claim 12, wherein said tool connection has slots in equal distances on its circumference and said clamp adapter has at least one alignment pin adapted to fit into any one of said tool connection slots.

14. A tool holder for robotic cutting or welding torches, comprising:

a housing having a facing part thereof;

a stop plate at least partially disposed within said housing and having a home position in which said stop plate is disposed proximate said housing facing part;

a tool connection coupled to said stop plate so that movement of said tool connection causes movement of said stop plate;

a piston element axially movably mounted in said housing, said piston element biased toward said stop plate, and said piston element disposed to be contacted by said stop plate and selectively slid axially in response to movement of either of said tool connection and said stop plate;

a detector sensor device including a trigger, said trigger disposed on said housing to be triggered by axial movement of said piston element; and a plurality of positioning elements disposed between said stop plate and said housing facing part, said positioning elements being cooperatively configured with at least one of said stop plate and said housing facing part so that in said home position only three of said positioning elements contact both of said stop plate and said housing facing part and position said stop plate relative to said housing facing, and at least one addition positioning element adapted to position said stop plate in response to either of said tool connection and said stop plate being tilted.

15. A tool holder for robotic cutting or welding torches, comprising:

a housing having a facing part thereof;

a stop plate at least partially disposed within said housing and having a home position in which said stop plate is disposed proximate said housing facing part;

a tool connection coupled to said stop plate so that movement of said tool connection causes movement of said stop plate;

a piston element axially movably mounted in said housing, said piston element biased toward said stop plate, and said piston element disposed to be contacted by said stop plate and selectively slid axially in response to movement of either of said tool connection and said stop plate;

a detector sensor device including a trigger, said trigger disposed on said housing to be triggered by axial movement of said piston element; and a plurality of positioning elements disposed between said stop plate and said housing facing part, three of said plurality of positioning elements being centered in a first common plane, at least one additional positioning element being centered outside of said first common plane, whereby in said home position only three of said positioning elements contact and position said stop plate relative to said housing facing part, and whereby said at least one additional positioning element is adapted to position said stop plate in response to either of said tool connection and said stop plate being tilted.

16. The tool holder of claim 15, wherein all additional positioning elements are centered in a second common plane.

17. The tool holder of claim 16, wherein said first common plane and said second common plane are essentially parallel to each other.

18. The tool holder of claim 17, wherein said positioning elements are located in recesses in at least one of said stop plate and said housing facing part.

19. The tool holder of claim 18, wherein said three positioning elements centered in said first common plane are located in recesses of a first depth and said additional positioning elements are located in recesses of a greater depth.

* * * * *

UNITED STATES PATENT AND TRADEMARK OFFICE
CERTIFICATE OF CORRECTION

PATENT NO. : 5,626,216
DATED : May 6, 1997
INVENTORS : Hermann Sperling et al.

It is certified that error appears in the above-identified patent and that said Letters Patent is hereby corrected as shown below:

Abstract, line 1;
    "curing" should be --cutting--.

Abstract, line 21;
    "element." should be --elements.--.

Column 1, line 7;
    "curing" should be --cutting--.

Column 1, line 31;
    "Tiffs" should be --This--.

Column 1, line 51;
    "comers" should be --corners--.

Column 1, line 54;
    "am" should be --are--.

Column 2, line 50;
    "are" should be --arc--.

Column 2, line 56;
    "tiffs" should be --this--

Column 2, line 67;
    "bottom 4" should be --bottom 6--.

UNITED STATES PATENT AND TRADEMARK OFFICE
CERTIFICATE OF CORRECTION

PATENT NO. : 5,626,216
DATED : May 6, 1997
INVENTORS : Hermann Sperling et al.

It is certified that error appears in the above-identified patent and that said Letters Patent is hereby corrected as shown below:

Column 3, line 9;
"dement" should be --element--.

Column 3, line 12;
"are" should be --arc--.

Column 3, line 17;
"flint" should be --that--.

Column 3, line 44;
"axle" should be --axis--.

Column 3, line 45;
"flat" should be --that--.

Column 6, claim 14, line 38;
"addition" should be --additional--.

Signed and Sealed this

Eleventh Day of November, 1997

Attest:

BRUCE LEHMAN

Attesting Officer

Commissioner of Patents and Trademarks